United States Patent [19]

Accetta

[11] 3,907,991

[45] Sept. 23, 1975

[54] METHODS OF KILLING CERTAIN BACTERIA AND FUNGI AND DIMINISHING DENTAL PLAQUE

[76] Inventor: Anthony F. Accetta, 375 Oakford St., West Hempstead, N.Y. 11552

[22] Filed: Feb. 25, 1974

[21] Appl. No.: 445,444

Related U.S. Application Data

[63] Continuation-in-part of Ser. No. 342,116, March 16, 1973, abandoned, which is a continuation-in-part of Ser. No. 151,638, June 10, 1971, abandoned.

[52] U.S. Cl. .............................................. 424/130
[51] Int. Cl.² ......................................... A61K 33/40
[58] Field of Search ........................................ 424/130

[56] References Cited
UNITED STATES PATENTS
3,384,542   5/1968   Accetta.............................. 424/130

*Primary Examiner*—Norman A. Drezin

[57] ABSTRACT

An oxygen releasing mixture is prepared by admixing (A) the reaction product of aqueous hydrogen peroxide and aqueous chromic acid, and (B) aqueous hydrogen peroxide.

5 Claims, No Drawings

METHODS OF KILLING CERTAIN BACTERIA AND FUNGI AND DIMINISHING DENTAL PLAQUE

This application is a continuation-in-part of Ser. No. 342,116 filed Mar. 16, 1973 which is a continuation-in-part of Ser. No. 151,638 filed June 10, 1971, both now abandoned.

BACKGROUND OF THE INVENTION

Evidence of tooth decay and peridontal disease has been found in the most ancient of human skulls.

Although much progress has been made in the last decade in trying to solve the vast problem of periodontal disease, there is still much more to be learned.

It is the purpose of this invention not only to control periodontal disease, but also to treat the disease once it has started. In this way teeth will have longer and more useful life, thus avoiding early or premature loss of teeth.

Periodontal disease usually begins with the formation of dental plaque around the teeth and gums. Plaque contains bacteria and if not removed they will grow progressively and form calculus, or tartar, which will eventually destroy normal, healthy surrounding gum tissue and underlying supporting bone structure, until the teeth become so loose that they will in many cases fall out of their sockets.

Plaque is difficult to see even on the exposed surfaces of the teeth, because it is colorless and transparent. Usually we have to stain plaque to see it. However, sometimes plaque accumulates so heavily that, without even staining, it can be seen as whitish mats. A most prevalent form of periodontal disease results from this progressive accumulation of bacterial plaque on the teeth and gums, along the gingival line. There are other factors which contribute to periodontal disease besides plaque. These factors are: poor oral hygiene, poor alignment of teeth, poor nutrition, certain systemic diseases, alcohol and drug use, etc.

Although the above are considered contributing factors, in most cases they do not directly cause periodontal disease.

It is evident that bacteria in the oral cavity is primarily responsible in causing periodontal disease. It is also evident that oral bacteria is of two types, anaerobic and aerobic, and is found in and around the following areas: saliva, teeth, mucous membranes, tongue, palate, cheeks, floor of mouth, tonsils, periodontal pockets, around orthodontic appliances, jacket crowns, permanent bridges, plates, etc.

Bacteria is also present in oral inflammations, gingivitis, acute and chronic infections of the jaws, pyorrhea, pericoronitis; or in general, almost any condition where pain and inflammation co-exist.

Brushing of the teeth and gums plus the use of conventional antiseptics have been found to be of little value in combatting periodontal disease.

It is most important at this point to understand that when a single dose of the mixture of the Invention is used, it will reach all areas where bacteria is present; simply by swishing the mixture around in the mouth for a period of one to two minutes. For example, if it is used for a specific purpose such as bleeding gums, the mixture will reach other areas that may be involved at the same time — like inflammation around permanent bridges or a semi-impacted wisdom tooth breaking through the gums, etc.

In order to avoid repetition throughout the Application, the following terms are made clear.

Mixture — refers to the "Final Solution" — Processed or Aged Solution (A) + aqueous hydrogen peroxide.

Plaque — refers to dental plaque around teeth and gums.

Chromic Acid — refers to the aqueous form.

Hydrogen Peroxide — Solution (B) and is also in the aqueous form.

DENTAL PLAQUE

There are two main forms of dental plaque: gingival plaque and cariogenic plaque.

Gingival plaque is usually an extension of plaque from the enamel surfaces of the teeth into and beneath the gingival margins. For some reason bacteria like to habitate just beneath the gingival margins of the teeth.

Cariogenic plaque usually causes caries or cavities, to form on the teeth. Sometimes the cavities are formed on difficult to clean areas, for example, in and around the crevices of the teeth or actually in the interproximal spaces (between the teeth). Bacteria in cariogenic plaque depends upon retained food particles containing carbohydrates and sugars, for necessary growth and development. Streptococcus mutans has often been found to be present in both gingival plaque and in cariogenic plaque.

Most periodontal damage begins with gingival plaque. The reason dental scientists have had difficulty in completely understanding dental plaque is that not all persons have the same bacteria present in their plaque formation. There exist too many variables. For example, one person may accumulate heavy plaque and calculus deposits around his teeth and gums and yet show no significant destruction or damage, whereas another person may have practically no deposits of plaque and calculus and still show severe periodontal destruction. What is agreed is that in the majority of cases bacteria will attach themselves around the teeth and gums and subsequently grow to form larger colonies, progressing in activity until they become chemically irritable thereby excreting toxins which eventually destroy normal structures. Bacteria most commonly found in plaque are: Staphlococcus aureus, cocci, chort rods, escherichia coli, molds trichomonads and streptococcus mutans.

DESCRIPTION OF THE PRIOR ART

In U.S. Pat. No. 3,384,542 issued May 21, 1968, in the name of the applicant, there is described for treatment of Oral Inflammatory Diseases, a mixture of aqueous chromic acid and aqueous hydrogen peroxide. Such mixture produces gaseous or molecular oxygen when freshly made. Some effectiveness was observed in treating inflamed oral tissue with such mixture. However, its use was somewhat limited to skilled personnel primarily because of the acidic and corrosive nature of chromic acid and the ever present danger of injuring oral tissue. It is the purpose of this invention to use the reaction products of the mixture in U.S. Pat. No. 3,384,542 and make them stable and safe for home treatment use and for the commercial packaging and handling of the product.

FORMULAS USED IN THE INVENTION

Amounts - Strengths - Proportions and Volume Ratios

Main Ingredients

Chromic Acid = 1–20 weight percent

Hydrogen Peroxide = 1–20 weight percent

Process Formula of Aged Solution (A)

Formula I 0.5 cc 8 cc of a 1–20 weight percent chromic acid, and, 30 cc, one ounce, of a 1–20 weight percent hydrogen peroxide.

Formula II — Preferred Proportions of Aged Solution (A)

1–2 cc of an 8 weight percent chromic acid in 30cc, one ounce, of a 3 weight percent hydrogen peroxide.

Formula III — Final Solution Aged Solution (A) + (B)

0.5–8 cc of a 1–20 weight chromic acid in 30 cc of a 1–20 weight percent hydrogen peroxide, above formula is processed and made stable, bottled and used as aged solution (A). When ready to be admixed with solution (B), 1–20 cc weight percent hydrogen peroxide, it will then be referred to as "The Final Solution".

Formula IV — Preferred Final Solution (A + B)

1–2 cc of an 8 weight percent chromic acid in 30 cc, one ounce, of a 3 weight percent hydrogen peroxide. Above formula is processed as described in process preparation of solution (A), and when ready for (freshly admixed) use, it is admixed with Solution (B), a 3 weight percent hydrogen peroxide to form a "Final Solution".

Formulas I & II are also processed as described in Process Preparation of Aged Solution (A).

Volume Ratio Proportions of Solutions (A + B)

A = representing Aged Solution (A)

B = representing Aqueous Hydrogen Peroxide

Broad Ranges

1:10 parts (A) to 10:1 parts (B)

Preferred Ranges

Mostly used in equal proportions 1 Part A to 1 Part B

Dosage

⅜ : ½ ounce combined equal parts of (A) and (B).

If desired, well known flavoring agents and other conventional additives (spearmint, fruit-mint etc.) may be employed in the Final Solution, or in Solution A and/or Solution B.

Manner of Use

The mixture described in this invention may be used in the form of an oral rinse or an oral spray.

The patient or professional can use both the oral spray and oral rinse. The dentist can use the mixture by freshly mixing the ingredients at the chair, placing equal proportions into his spray bottle, which should be conveniently located near his chair and attached by means of tubing, to his air compressor unit.

It can be used in aerosol containers with dual compartmented chambers or also can be packaged in separate bottles (A) + (B).

Whether the mixture of the invention is used by the patient as an oral rinse or spray, or administered to him by his dentist in the form of a spray — the procedure in its use is the same. That is, swishing around in the mouth from 1 – 2 minutes etc.

It has been explained that not all patients have the same type of bacteria or the same rate of progressive accumulation of plaque and calculus. For this reason more significant results in controlling periodontal disease can be accomplished by the patient visiting his dentist periodically. In this way the dentist will observe how much and at what rate plaque or calculus accumulation is occurring. He will then either decrease or increase the home use of the mixture of the Invention. Usually 3 to 4 treatments by the dentist — plus 2 to 3 times per week of home use treatment, is normal for maintaining a clear, healthy mouth.

Some patients may require daily use of the mixture for a certain period of time only.

It should be obvious that there will be less bacteria present in the oral cavity with each treatment, and that it will take a certain length of time to allow the removed bacteria to form again. Again, some patients will have faster bacterial growth than others.

Process Preparation of Aged Solution (A)

The following process will describe the formation of Aged Solution (A), using chromic acid and hydrogen peroxide to obtain the necessary reaction product. Because of the complex nature of this reaction, a specific name of the product formed is difficult to determine. However, it is believed to contain a chromium chromate complex. When standing for an extended period of time, i.e., overnight, there is obtained an Aged Solution (A), which is believed to contain chromium chromate, possibly chromium dichromate or a mixture of both. What seems to be certain is that the product formed contains both chromium +3 trivalent, and chromium +6 hexavalent ions. Chromic acid per se, contains only hexavalent ions.

STEP I — Using Formula No. II 2 cc of an 8 weight percent chromic acid, and 30 cc, one ounce, of a 3 weight percent hydrogen peroxide.

Object - To make 1 quart 32 ounces of Aged Solution (A)

2 ounces of an 8 weight percent chromic acid and 30 ounces of a 3 weight percent hydrogen peroxide are used as the reactants. The above reactants are poured into a one gallon drumtype container

STEP II — Pouring of Reactants

The ingredients are poured very slowly so as to completely decompose the hydrogen peroxide until no further oxidation with chromic acid can take place. An even, smooth distribution of liberated oxygen is essential in order to obtain the desired pH of the resultant solution. If either of the reactants is poured too quickly, a sudden burst of oxygen will result, thus interfering with the pH.

STEP III — Precautions During Reaction

Immediately following the pouring of the last ingredient, the drum is covered with aluminum foil in order to avoid contamination from the impurities in the air. This step is important because the active reaction lasts for several hours and stability at this point is very low. When the oxygen liberation ceases, the resultant solution will be stable, possessing a long shelf-life and will not be affected by exposure to air, light, heat or cold temperature changes.

STEP IV — Bottling Solution

The above solution when aged from 24 hours until several years will be referred to as "Aged Solution (A) or the novel solution (A)," and will be ready for bottling, shipping and handling without fear or danger of contamination.

Althrough the pH of the solution is checked periodically during the active reaction process, a final check should be given prior to bottling. For best efficacy the pH should be around 4. It can also range from 2.5 to 6.

The above described process should be undertaken under ambient conditions of temperature and pressure, e.g. about 20° C to about 25° C at approximately atmospheric pressure and under as close to sanitary conditions as possible.

Lower temperatures can be employed. Higher temperatures tend to accelerate the decomposition of the hydrogen peroxide.

Conditions Contributing to Periodontal Disease

Gingivitis — (mild to severe), or bleeding gums, as is commonly referred to, is one of the most important symptoms of periodontal disease. Since this condition infrequently causes pain, the temptation to neglect it is understandable. The following bacteria are frequently found in severe cases of gingivitis — *Streptococcus viridaus*, *Escherichia coli*, Neisseria SP, *Beta Hemolytic streptococcus* Group A, Borrelia etc. etc. Spraying into the periodontal pockets, especially after the dentist has scaled the teeth, will result in faster removal of the invading bacteria. Most of the bacteria found in gingivitis is the anaerobic variety, making removal with the use of the mixture of the invention easier.

Acute Ulcerative Gingivitis - Trench Mouth

Anaerobic bacteria responsible or causitive bacteria, are: *Fusiform bacillus* and Spirochetes. Sufferers from this ailment respond very well to the mixture of the Invention. Spray or oral rinsing can be applied.

Loose Teeth

In acute periodontal inflammations, the teeth involved tend to become loose due to the pulling away of the gingival attachments from the teeth. Spraying or oral rinsing with the mixture will decrease the inflammation and return the tissue to its normal condition.

Pericoronitis

Pericoronitis is a condition where the gums around unerupted third molar teeth become swollen and inflamed, causing much pain and discomfort. Inflammation at times extending to the throat and sub-maxillary glands. Spraying or oral rinsing with the mixture has been helpful in relieving pain and returning inflamed tissue to its normal state.

Description of the Expectorated Foam

The contents of the expectorated foam differs according to the condition treated. For example, if the mixture of the invention is to be used for prevention or control, the condition of the teeth and gums are usually in a fairly healthy state. The expectorated foam will them be from a white to grayish color and the type of bacteria removed will be more or less the bacteria commonly found in and around the oral cavity, that if not removed, will go on to form dental plaque. On the other hand, if the purpose of using the Final Solution is to treat an already existing condition of gingivitis, the expectorated foam will contain bacteria causing the inflammation, and the color of the foam will be that of a brownish color due to the presence of blood. Streptococcus viridaus is most commonly found in periodontal pockets. It has been observed that the foamy portion of the expectorated foam will usually contain active but dying bacteria.

Significance of Test Solutions on Bacteria Tested

Example II of the test solutions submitted with this application shows a remarkable bactericidal effect upon three of the most common types of bacteria found in plaque formation and in periodontal diseases; *staphlococcus aureus*, *Escherichia coli* and *Streptococcus mutans*, also bacteria present in saliva.

Saliva

The Final Solution shows an ability to penetrate saliva which contains and carries bacteria. Although saliva contains bacteria, bacterial growth and multiplication in salivary medium is rare.

Saliva contains mucin, a glycoprotein which imparts to saliva a high viscosity. When saliva contacts bacteria, mucoid substances are formed by mucin. Mucin is excreted by the mucous membranes and also by the sub-lingual glands. It is semi-permeable in nature, forming a net-work which attracts and carries bacteria.

*Escherichia coli*

This type of bacteria is common in plaque. All chromium solutions tested were found to be highly effective in killing bacteria. When Aged Solution (A) was used alone, it was not effective in killing *Escherichia coli*. This may be due to the absence of the fresh oxygen liberation.

*Streptococcus mutans*

This type of bacteria is also most commonly found in the plaque and also in caries formation.

*Staphlococcus aureus*

All chromium solutions were highly effective in killing staphlococcus aureus bacteria. This type represents the aerobic variety of bacteria found in plaque. It was selected to show the broad-spectrum activity of the mixture in this invention.

*Candida alicans*

It was quite surprising to find that of all chromium mixtures tested, only the "Final Solution" showed efficacy on the fungus (Yeast), *Candida albicans*. *Candida albicans* has been found to be present in some dentures made of acrylic resin. It is also present as lesions in sufferers of leukemia and Hodgkins diseases. The lesions which are side effects from the poisons used in chemotherapy, appear on the gums, palate, floor of mouth or tongue. They are quite painful and prevent the victims of the above diseases from getting proper nourishment, the mixture of the invention will aid in releiving some of the symptoms.

Observations of Submitted Bacteriological Tests

Test Solution I — (Aqueous Chromic Acid $H_2CrO_4$)

| | |
|---|---|
| *Staphlococcus aureus* | not effective |
| *Streptococcus mutans* | not effective |
| *Escherichia coli* | not effective |
| Saliva | not effective |

Test Solution III — Aged Solution (A)

| | |
|---|---|
| *Staphlococcus Aureus* | highly effective |
| *Streptococcus Mutans* | highly effective |
| *Escherichia Coli* | not effective |
| Saliva | highly effective |

The novel Aged Solution (A) showed direct opposite effect on the same bacteria tested as chromic acid — with the excception of *Escherichia coli*.

Example I

Solution A was prepared by adding slowly to 30 cc 3 weight percent aqueous hydrogen peroxide (containing not over 1/10 grain acetanilid per fluid ounce) 1 cc of an 8 weight percent aqueous chromic acid. Within a minute, the mixture darkened and a vigorous evolution of molecular oxygen began. The reaction proceeded as described in the process preparation of Solution A.

The mixture of the Invention becomes a "Final Solution", when it is ready for use. It is a combination of the above described Solution A, and a freshly admixed solution of a 3 weight percent aqueous hydrogen peroxide.

When the Final Solution is held in the mouth for 1 – 2 minutes, pressure from the gradual liberation of molecular oxygen causes the cheeks to puff up similar as to when air is pumped into a balloon.

After the contents are expectorated, the mouth is left with a clean, fresh astringent feeling lasting several hours.

The Final Solution can be used to treat oral disease or conditions where hydrogen peroxide has formerly been used. The Final Solution, as prepared in formulas III & IV is effective in removing bacteria from the oral cavity.

Aged Solution A is effective on oral bacteria when used alone. However, it is preferred to be freshly admixed with aqueous hydrogen peroxide during the admministration of the mixture in controlling periodontal disease.

Example 2

In the following Example, Five Test Solutions were inoculated with viable cells, i.e., *Staphlococcus aureus*, saliva, *Escherichia coli*, *Streptococcus mutans*, *Candida albicans*, and *Aspergillus niger*. The five Test Solutions were as follows:

i. Aqueous solution of 0.1333 weight percent chromium trioxide;
ii. Aqueous solution of 1.5 weight percent of hydrogen peroxide;
iii. Aged Solution A prepared by admixing 1 milliliter of an aqueous solution of 8 weight percent chromium trioxide with 29 milliliters of 3 weight percent aqueous $H_2O_2$. This solution was "aged" for approximately 5 weeks before use.
iv. Fresh Solution A prepared as indicated in (iii) above.
This solution was used in the experiments within a few minutes after preparation.
v. Final Solution prepared by admixing 1 milliliter of Aged Solution A of (iii) above with 1 milliliter of 3 weight percent $H_2O_2$. The Final Solution was employed in the experiments within minutes after preparation.

The test organisms and inocula levels used in the experiments are identified below:

| Test Organisms | Viable Cells/Ml. of Test Solution |
|---|---|
| *Staphylococcus aureus* | $11 \times 10^8$ |
| *Saliva* | $33 \times 10^5$ |
| *Escherichia coli* | $18 \times 10^8$ |
| *Streptococcus mutans* | $30 \times 10^7$ |
| *Candida albicans* | $30 \times 10^5$ |
| *Aspergillus niger* | $49 \times 10^5$ |

The test method employed was as follows: 9 milliliters of each test solution was inoculated under ambient conditions, e.g., about 22°C., with approximately 1,000,000,000 viable cells per milliliter. After 1, 5 and 10 minutes, one milliliter aliquots were transferred from the inoculated mixtures into 99 ml of neutralizing solution. The resulting solutions were subsequently serially diluted in 0.1 weight percent peptone water. Plates were poured with Tryptic Soy Agar for the bacteria and incubated at 370°C for 48 hours. Yeast plates were poured with Mycaphil Agar and incubated at 32°C for 48–72 hours.

The neutralizing solution used to stop the bactericidal, etc., activity of the test organism is made by admixing 11.9 weight percent Tween 80, 1.7 weight percent Azolectin, 3 weight percent Tamol, and 1 weight percent peptone in water. The resulting mixture is boiled for about 15 minutes or until all components are dissolved. Thereafter, it is dispensed in desired volumes such as 9 ml, 99 ml, etc., and autoclaved at 250°F, 15 psig, for 15 minutes. Immediately upon removal from sterilizer, i.e., while still very hot, the bottles should be well shaken since Tween tends to come out of solution during autoclaving. The function of this neutralizing solution is to render a bactericidal agent inactive by dispersing the molecules that give it its bacteriocidal properties.

Peptone is a nitrogen-containing nutrient by Difco Laboratories (Difco Manual of Dehydrated Culture Media and Reagents for Microbiological and Clinical Laboratory Procedure, Difco Laboratory Inc., 9th Edition, Detroit, Michigan, page 256 (1971)). Tween 80 is an emulsifier and solubilizer, polyoxyethylene 20 sorbitan monooleate by Atlas Chemical Company. Azolectin is lecithin by Associated Concentrates Company. Tamol is the sodium salt of condensed naphthalene sulfonic acid by Rohm and Haas Corporation.

The controls are described in further detail below. One milliliter of each Test Solution was placed in separate bottles containing 99 ml neutralizing solution and were well shaken. One and 0.1 ml aliquots were placed in sterile petri dishes. Each test organism was diluted to contain approximately 1,000 cells per ml and then one-tenth ml of this suspension was placed directly on the 1 and 0.1 ml aliquots. After 30 minutes, plates were poured with respective agars and incubated at appropriate temperatures. Organism controls consisted of placing 0.1 ml of each cell suspension in a petri dish and pouring with designated agars. After incubation, plates were counted to determine the number of organisms surviving the test solution plus exposure to neutralizing solution.

The number of viable organisms after exposure to the various Test Solutions at the end of each time period (1 minute, 5 minutes, and 10 minutes) is set forth in Tables I through VI below.

TABLE I

| Test Solution | Activity After Test (*Staphylococcus aureus* $11 \times 10^8$) | | |
|---|---|---|---|
| | 1 Minute | 5 Minutes | 10 Minutes |
| 0.1333 Wt.% $CrO_3$ | $84 \times 10^5$ | $12 \times 10^3$ | $11 \times 10^3$ |
| 1.5 Wt. % $H_2O_2$ | $37 \times 10^6$ | $37 \times 10^6$ | $20 \times 10^6$ |
| Aged Solution A | <100 | <100 | <100 |
| Fresh Solution A | <100 | <100 | <100 |
| Final Solution | <100 | <100 | <100 |

TABLE II

| Test Solution | Activity After Test (*Saliva* $33 \times 10^5$) | | |
|---|---|---|---|
| | 1 Minute | 5 Minutes | 10 Minutes |
| 0.1333 Wt. % $CrO_3$ | $36 \times 10^3$ | <100 | <100 |
| 1.5 Wt. % $H_2O_2$ | $34 \times 10^4$ | $15 \times 10^4$ | $12 \times 10^2$ |
| Aged Solution A | <100 | <100 | <100 |
| Fresh Solution A | <100 | <100 | <100 |
| Final Solution | <100 | <100 | <100 |

TABLE III

| Test Solution | Activity After Test (*Escherichia coli* $18 \times 10^8$) | | |
|---|---|---|---|
| | 1 Minute | 5 Minutes | 10 Minutes |
| 0.1333 Wt. % $CrO_3$ | $23 \times 10^4$ | <100 | <100 |
| 1.5 Wt. % $H_2O_2$ | <100 | <100 | <100 |
| Aged Solution A | $98 \times 10^4$ | $24 \times 10^4$ | $14 \times 10^3$ |
| Fresh Solution A | <100 | <100 | <100 |
| Final Solution | <100 | <100 | <100 |

TABLE IV

| Test Solution | Activity After Test (*Streptococcus mutans* $30 \times 10^7$) | | |
|---|---|---|---|
| | 1 Minute | 5 Minutes | 10 Minutes |
| 0.1333 Wt. % $CrO_3$ | $84 \times 10^2$ | $70 \times 10^2$ | $80 \times 10^2$ |
| 1.5 Wt. % $H_2O_2$ | $38 \times 10^6$ | $24 \times 10^6$ | $14 \times 10^5$ |
| Aged Solution A | <100 | <100 | <100 |
| Fresh Solution A | <100 | <100 | <100 |
| Final Solution | <100 | <100 | <100 |

TABLE V

| Test Solution | Activity After Test (*Candida albicans* $30 \times 10^5$) | | |
|---|---|---|---|
| | 1 Minute | 5 Minutes | 10 Minutes |
| 0.1333 Wt. % $CrO_3$ | $44 \times 10^5$ | $25 \times 10^5$ | $95 \times 10^4$ |
| 1.5 Wt. % $H_2O_2$ | $23 \times 10^5$ | $22 \times 10^5$ | $48 \times 10^5$ |
| Aged Solution A | $76 \times 10^1$ | $51 \times 10^2$ | <100 |
| Fresh Solution A | $38 \times 10^5$ | $79 \times 10^3$ | $24 \times 10^4$ |
| Final Solution | $26 \times 10^3$ | <100 | <100 |

TABLE VI

| Test Solution | Activity After Test (*Aspergillus niger* $49 \times 10^5$) | | |
|---|---|---|---|
| | 1 Minute | 5 Minutes | 10 Minutes |
| 0.1333 Wt. % $CrO_3$ | $12 \times 10^5$ | $20 \times 10^5$ | $20 \times 10^5$ |
| 1.5 Wt. % $H_2O_2$ | $18 \times 10^5$ | $23 \times 10^5$ | $18 \times 10^5$ |
| Aged Solution A | $16 \times 10^5$ | $80 \times 10^4$ | $24 \times 10^4$ |
| Fresh Solution A | $44 \times 10^4$ | $33 \times 10^4$ | $36 \times 10^4$ |
| Final Solution | $39 \times 10^4$ | $13 \times 10^5$ | $38 \times 10^4$ |

The data in Tables I through VI after one minute exposure of the viable cells to the Test Solutions were as follows. The novel Final Solution was effective in killing *Staphyloccus aureus*, bacteria in saliva, *Escherichia coli*, and *Streptococcus mutans*. Aqueous solution of hydrogen peroxide was only effective against *Escherichia coli*. Aqueous solution of 0.1333 weight percent $CrO_3$ was not effective. None of the Test Solutions was effective against *Aspergillus niger*.

EXAMPLE 3

In the following Example, 10 Test Solutions were inoculated with *Staphylococcus aureus* ($11 \times 10^8$). The 10 Test Solutions were as follows:
  i. Aqueous solution of 0.1333 weight percent of cobaltous chloride ($CoCl_2$).
  ii. Aqueous solution prepared by admixing equal volumes of an aqueous solution of 0.267 weight percent of cobaltous chloride and 3 weight percent aqueous $H_2O_2$.
  iii. Aqueous solution of 0.1333 weight percent of cupric chloride ($CuCl_2$).
  iv. Aqueous solution prepared by admixing equal volumes of an aqueous solution of 0.267 weight percent of cupric chloride and 3 weight percent aqueous $H_2O_2$.
  v. Aqueous solution of 0.1333 weight percent of nickel chloride ($NiCl_2$).
  vi. Aqueous solution prepared by admixing equal volumes of an aqueous solution of 0.267 weight percent of nickel chloride and 3 weight percent aqueous $H_2O_2$.
  vii. Aqueous solution of 0.1333 weight percent of chromic trichloride ($CrCl_3$).
  viii. Aqueous solution prepared by admixing equal volumes of an aqueous solution of 0.267 weight percent of chromic trichloride and 3 weight percent aqueous $H_2O_2$.
  ix. Aqueous solution of 0.1333 weight percent of ferric trichloride ($FeCl_3$).
  x. Aqueous solution prepared by admixing equal volumes of an aqueous solution of 0.267 weight percent of ferric trichloride and 3 weight percent aqueous $H_2O_2$.

The test method, neutralizing solution, control, and procedure of Example 2 were employed in this Example 3. The data are recorded in Table VII below:

TABLE VII

| No. | Test Solution | Activity After Test (*Staphylococcus aureus* 11 ×10⁸) | | |
|---|---|---|---|---|
| | | 1 Minute | 5 Minutes | 10 Minutes |
| (i) | Aqueous $CoCl_2$ | $79 \times 10^6$ | $64 \times 10^6$ | $47 \times 10^6$ |
| (ii) | $CoCl_2 + H_2O_2$ | $23 \times 10^6$ | $10 \times 10^4$ | $36 \times 10^2$ |
| (iii) | Aqueous $CuCl_2$ | $75 \times 10^6$ | $64 \times 10^6$ | $49 \times 10^5$ |
| (iv) | $CuCl_2 + H_2O_2$ | $50 \times 10^4$ | <100 | <100 |
| (v) | Aqueous $NiCl_2$ | $81 \times 10^5$ | $85 \times 10^6$ | $68 \times 10^6$ |
| (vi) | $NiCl_2 + H_2O_2$ | $38 \times 10^6$ | $19 \times 10^6$ | $11 \times 10^5$ |
| (vii) | Aqueous $CrCl_3$ | $19 \times 10^6$ | $60 \times 10^5$ | $47 \times 10^5$ |
| (viii) | $CrCl_3 + H_2O_2$ | $26 \times 10^6$ | $28 \times 10^5$ | $80 \times 10^2$ |
| (ix) | Aqueous $FeCl_3$ | $86 \times 10^6$ | $62 \times 10^6$ | $80 \times 10^6$ |
| (x) | $FeCl_3 + H_2O_2$ | $>30 \times 10^6$ | $10 \times 10^4$ | $10 \times 10^2$ |

EXAMPLE 4

Three to four drops of stain (fluorescein sodium, 0.75 weight percent in buffered glycerol) were placed in the mouth in the back region of the lower front teeth of an adult male subject. The stain was mixed with saliva, swished in the mouth a few times, followed by expectoration. The mouth was then rinsed twice with water. A Plaq-Lite was turned on and focused on the teeth. (The Plaq-Lite is a source of ultra-violet light). Substantial plaque formation on the subject's teeth was observed as evidenced by the glowing yellow color. After this, approximately 0.5 ounce of the Final Solution described in Example 2 supra was placed in the subject's mouth, swished a few times, followed by expectoration, and then with rinsing with water. The teeth were then restrained in the manner described above. When the Plaq-Lite is again turned on and focused on the restrained teeth, there was observed a marked decrease in the yellow color. This test visually indicates that a significant decrease in plaque and other oral debris has been effected by the oral use of the novel Fresh Solution.

What is claimed is:

1. A method of killing *Escherichia coli, Streptococcus mutans, Staphylococcus aureus,* or *Candida albicans* present in inflamed tissues of the mouth, which comprises contacting said bacteria or fungus with an effective, non-toxic amount of a freshly prepared composition consisting of aged solution (A), which comprises the reaction product of 0.5 to 8 ml of a 1 to 20 weight percent aqueous chromic acid solution and 30 ml of a 1 to 20 weight percent aqueous hydrogen peroxide solution, said product exhibiting a pH of about 4, contains both $Cr^{+3}$ and $Cr^{+6}$ ions, and has been aged at least 24 hours; and solution (B), which consists of a 1 to 20 weight percent aqueous hydrogen peroxide solution in the proportion of between 1:10 and 10:1 of solution (A) to solution (B).

2. The method of claim 1 wherein the proportions by volume of said aged solution (a) and said hydrogen peroxide (b) are 1:1.

3. The method of claim 1 wherein said composition consists of the reaction product of 1 to 2 cc of 8 percent chromic acid solution and 30 cc of 3 percent hydrogen-peroxide to form solution (A) and solution (B) is 30 cc of 3 percent hydrogen peroxide.

4. The method of diminishing dental plaque which comprises applying to the mouth of the subject having dental plaque an effective non-toxic amount of a freshly prepared composition consisting of aged solution (A), which comprises the reaction product of 0.5 to 8 ml of a 1 to 20 weight percent aqueous chromic acid solution and 30 ml of a 1 to 20 weight percent aqueous hydrogen peroxide solution, said product exhibiting a pH of about 4, contains both $Cr^{+3}$ and $Cr^{+6}$ ions, and has been aged at least 24 hours; and solution (B) which consits of a 1 to 20 weight percent aqueous hydrogen peroxide solution; in the proportion of between 1:10 and 10:1 of solution (A) to solution (B).

5. The method of claim 4 wherein said composition consists of the reaction product of 1 to 2 cc of 8 percent chromic acid solution and 30 cc of 3 percent hydrogen peroxide to form solution (A) and solution (B) is 30 cc of 3 percent hydrogen peroxide.

* * * * *